March 12, 1957 J. STURZENEGGER 2,784,844
DEVICE FOR CLEANING THE GRILLE OF HYDRAULIC INSTALLATIONS
Filed Nov. 4, 1953 2 Sheets-Sheet 1

INVENTOR
Jean Sturzenegger.
BY
ATTORNEY

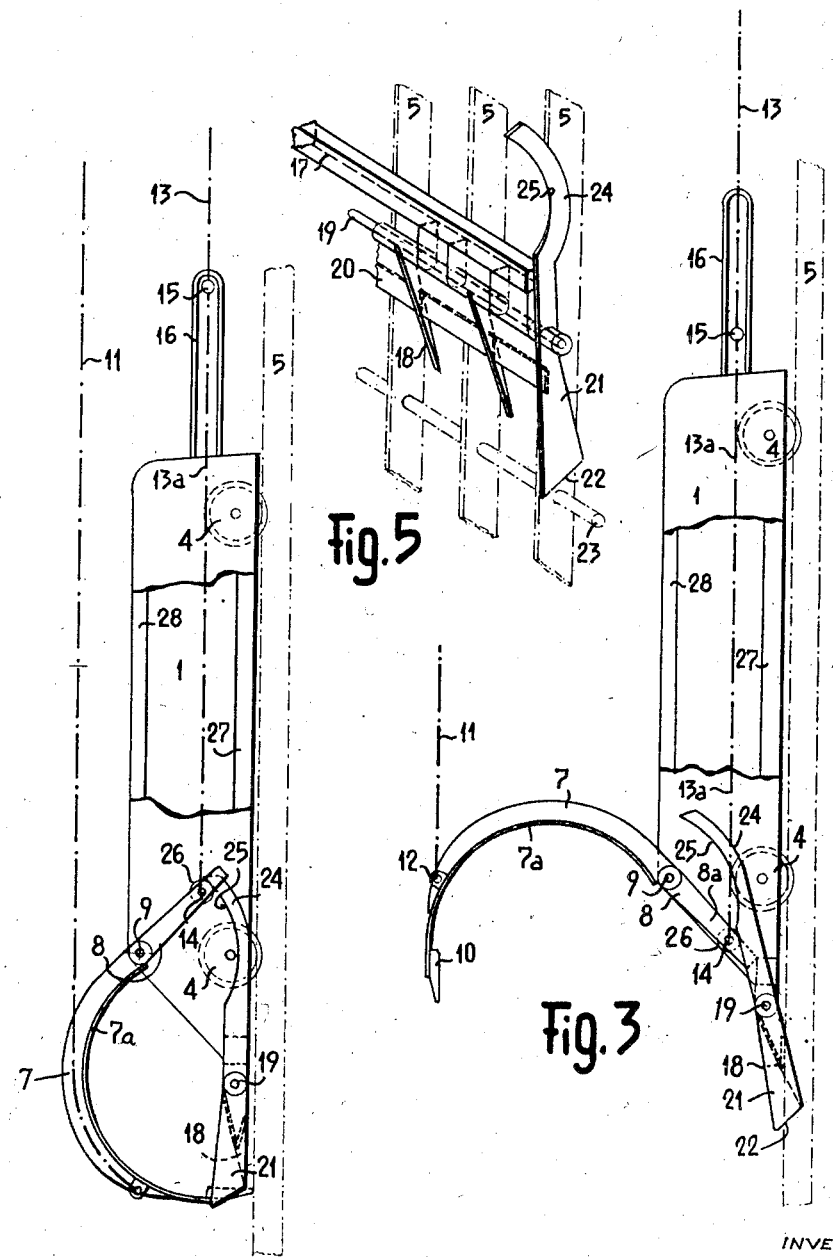

United States Patent Office 2,784,844
Patented Mar. 12, 1957

2,784,844

DEVICE FOR CLEANING THE GRILLE OF HYDRAULIC INSTALLATIONS

Jean Sturzenegger, Geneva, Switzerland, assignor to Atelier de Construction Jonneret S. A., Geneva, Switzerland, a corporation of Switzerland Application November 4, 1953, Serial No. 390,143

Claims priority, application Switzerland November 11, 1952

3 Claims. (Cl. 210—176)

This invention relates to a device for cleaning the grille of a hydraulic installation of the type comprising a carriage adapted to be displaced along the grille, the said carriage supporting a cradle rockably secured to the carriage and designed to serve as a receptacle for the detritus or debris lodged against the grille, at least two cables being provided for controlling the carriage and the cradle, one of the cables being secured to the cradle proper.

This application is related to my copending application Serial Number 390,144, filed on November 4, 1953.

In an apparatus of the type heretofore used, the cleaning or clearing of the grille takes place only during the ascending movement of the carriage against the grille. In addition, such apparatus has the disadvantage of dispersing the debris on the portion of the grille to be cleaned while the carriage descends into the water. As a result, when the carriage is raised, the scavenging means picks up only a fraction of the debris lodged against the portion of the grille which is to be cleaned and the floating materials which have been dispersed, as above indicated, cannot be removed in an efficient manner.

Also in prior arrangements of this type, the closing motion of the cradle is controlled merely by the release of a cable, for instance, which allows the cradle to fold back by gravity against the grille by the weight of the cradle itself. Depending on the nature of the debris which is covered by the cradle on its descent, the weight of the cradle is not sufficient for a firm grip on the debris with the result that the latter escape from the cradle while the carriage is being raised.

The device according to the invention tends to remedy this disadvantage. It is characterized by the fact that the cradle is positively closed about the debris by relative movement of its parts which are forced to embrace the debris until the time of discharge.

The accompanying drawing shows, diagrammatically and by way of example, an embodiment of the cleaning or scavenging device forming the subject matter of the invention.

Figure 3 is a side view of the carriage in the descending position with the cradle open.

Figure 4 is a view, similar to the previous one, of the carriage in the ascending position with the cradle closed.

Figure 5 is a detail partial perspective view of a portion of the cradle.

Figures 1, 2:
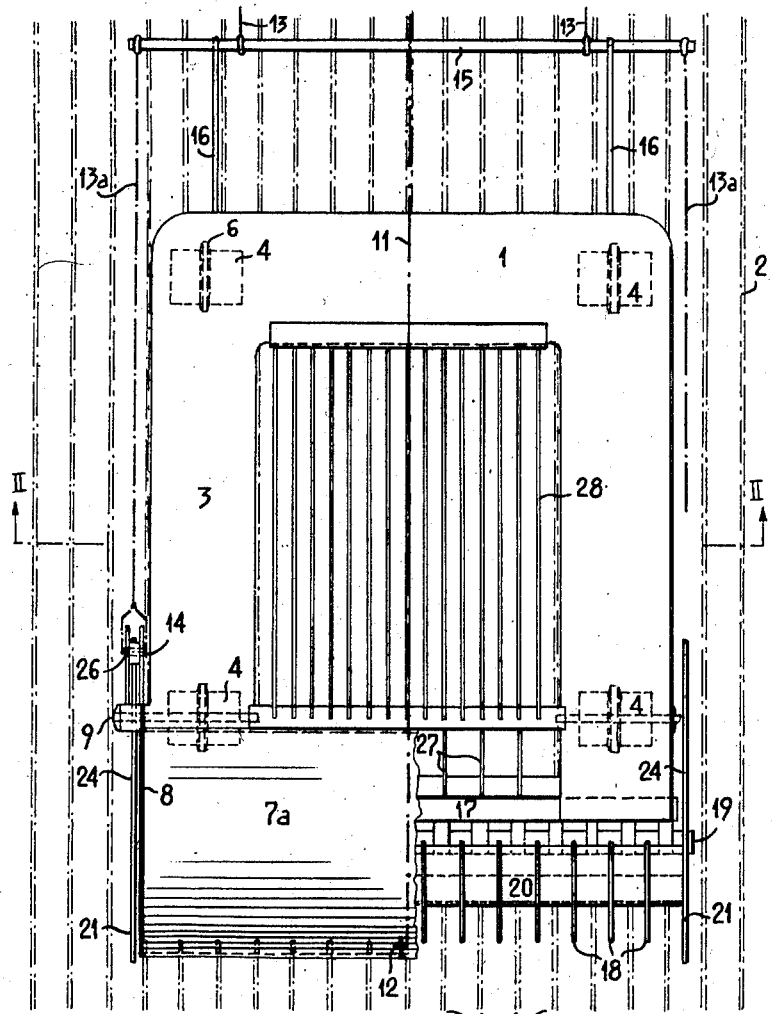
Figure 1 is a horizontal elevational view, with portions broken away, of the scavenging device disposed against the grille of a hydraulic installation.
Figure 2 is a section along II—II of Fig. 1.

As shown in Figs. 1 and 2, the device for cleaning the grille of a hydraulic installation comprises a carriage 1 adapted to be displaced along the grille of a hydraulic installation, such as a hydroelectric power plant or a pumping installation.

This carriage 1 comprises a frame 3 of generally U shape and which is mounted on two pairs of rollers 4 adapted to roll on the bars 5 of grille 2. Each roller is provided with a rib 6 to guide the rollers along the grille bars 5.

The carriage 1 supports a rockably mounted scavening device in the order of a clam shell bucket or cradle 7 and which primarily consists of a piece of sheet metal substantially co-extensive with the width of the carriage to provide a receptacle for collecting the debris in front of the grille. The cradle 7 constituted as just described is also provided at the opposite ends thereof with a pair of frame members 8 which have their forward portions of arcuate formation to support and hold the sheet metal portion 7a while the ends of the frame members extending beyond the inner edge of the sheet metal portion 7a provide levers 8a. The frame members including the levers 8a are pivoted to the carriage as indicated at 9, and, as will appear from the drawings, the free edge of the sheet metal scoop portion of the cradle may be provided with claws 10 to facilitate handling of the debris.

In order to effectuate the operation of the carriage and the portions of the cradle, preferably several groups of cables are provided. One group operates parts of the cradle and the other group includes the main cables for lifting and lowering the carriage.

In the form of construction shown in the drawings, the group of cables for operating the cradle are identified as 11 and 13a—13a. The cable 11 is secured at its lower end to the medial portion of the scoop of the cradle, as indicated at 12, as will be apparent from Figures 1 and 3. The remaining cables 13a are connected at their lower ends to the levers 8a of the cradle disposed at the side of the pivot 9 opposite the edge of the cradle including the claw 10.

The upper end of the single cable 11 is connected to a winch (not shown), while the upper ends of the cables 13a are connected to the outer ends of the equalizing bar 15, as will be apparent from Figure 1. It will also be seen from the drawings that the equalizing bar 15 is guided in two slotted supporting members 16 connected with the upper portion of the carriage. Thus, the equalizing bar 15 is guided substantially parallel to the direction of displacement of the carriage in relation to the grille.

The second group of cables 13 have their lower ends connected to the medial portions of the equalizing bar and their upper ends are connected to a winch, not shown. These cables control the sliding movement of the carriage 1 relative to the grille 2.

A row of teeth or prongs 18 intended to pick up the debris lodged against the grille, while the carriage descends along the grille, are hinged to the crosspiece 17 by means of a shaft 19. Prongs 18 are integral with one another through a plate 20. At each end of the row of prongs is an actuating camming arm 21 whose nose 22 provides a camming edge to raise prongs 18 when the carriage passes over a cross-bar 23 of the grille 2.

Means for controlling the raising of said prongs 18 when cradle 7 is closed consists of a second arm 24 extending rearwardly beyond the point where the prongs are linked to the carriage. Edge 25 of said second arm cooperates during the closing of the cradle with a roller 26 mounted near the free end of the corresponding lever 8a of the cradle.

As shown in Figs. 1 and 2, the carriage is constructed in such a way as to form a receptacle, the bottom of which opens downwardly and is provided with grilles on both sides of frame 3. The inner grille is formed by bars 27 disposed parallel to one another and spaced apart by a distance substantially equal to the spacing of bars 5 of grille 2. The outer grille is formed by bars 28 spaced closer together than the bars of the inner grille. The frame 3, in effect, forms the top of the receptacle.

The operation of the device herein described is as follows:

When not in use, carriage 1 is held at the top of grille 2 by cables 11 and 13, controlled by one or several winches (not shown) set up in the control cabin of the hydraulic installation.

When the device is to be used, cables 11 and 13 are unwound at substantially the same rate of speed to enable the carriage to descend along the grille 2, its cradle then being in the open position as shown in Figure 3.

During this descending movement, the materials floating on the surface of the water in which grille 2 is immersed enter the receptacle formed by the carriage proper. The prongs 18, moving between bars 5 of the grille, act to disengage from the latter any debris lodged against it, the grille bars 27 and 28 allowing the water to pass therethrough, but retaining the debris.

When prongs 18 pass over a cross-bar 23, the cam-forming edge 22 of arms 21 assures the retraction of said prongs from the grille. As soon as the carriage reaches the lower part of the grille, the winch controlling cable 13 is stopped, while the winch controlling cable 11 continues to unwind that cable. Thus, cradle 7 is closed by a rocking movement due partly to the action of its own weight because the cable 11 is slack and partly to the action of the weight of the carriage 1 which presses on the levers 8a of said cradle pivotally secured to the carriage at 9. Thus thrust of the carriage assures a perfect closing movement of the cradle. During this rocking motion, cradle 7 pivots about point 14 of levers 8a.

Simultaneously with the closing movement of the cradle, prongs 18 retract from grille 2. In fact, while the cradle rocks, rollers 26 enter into contact with arcuate edge 25 of actuating arms 24 and push the same backward. The motion imparted to prongs 18 through arms 24 together with the action of the cradle results in a firm gripping of the materials engaged in the latter. Once the cradle is closed, the winch controlling cables 13 winds these cables, and the carriage is brought back to the upper part of the grille.

The fastening of cables 13a at the free end of levers 8a of the cradle thus prevents premature opening of the cradle. After having been brought near the control cabin, carriage 1 and its cradle 7 can be unloaded of the debris which they contain, either into a canal or into a truck provided for their disposal.

It will be understood, of course, that, by way of modification, the type of rocking cradle 7 hereinabove described could be applied to any other type of existing carriage.

It will also be understood that such a cradle could function even on a carriage without teeth or prongs 18 or else provided with prongs 18 that are stationary with respect to the carriage.

The arrangement described above is susceptible of various structural modifications. In particular, cables 13a could be replaced by connecting rods, one end of which would be secured, at 14, to the levers 8a, whereas the other end would be guided, either by the slotted supporting members 16 or by any other known arrangement of this kind.

It is further pointed out that the invention hereinabove described could be used for cleaning grilles disposed either obliquely or vertically, inasmuch as the automatic arrangement for tightly closing cradle 7 by means of cables 13 provides means for maintaining the cradle in a closed position even with vertical displacement of the carriage.

I claim:

1. A device cleaning the grillwork of hydraulic installations, said grillwork having a cross bar, comprising, in combination, a carriage member adapted to be moved along said grillwork, said carriage member including an inverted U-shaped frame, two pairs of roller members mounted respectively at the open and closed ends of the U-shaped frame for supporting said frame upon the grillwork in rolling reciprocating relationship parallel to the legs of the U-shaped frame, inner and outer grillwork structures extending respectively over opposite open faces of the U-shaped frame, a cradle member rockably secured to said carriage member on an axis passing through both free ends of the legs of the U-shaped frame and rockable over and away from the open end of the U-shaped frame, lever members fixed to said cradle having free ends extending to the opposite side of said pivot axis from said cradle, each lever member having a roller member attached at the respective free end thereof, means for controlling the carriage and the cradle in their simultaneous movement along said grillwork, one portion of said means being operatively connected to said cradle and the other portion of said means being operatively connected to each of said lever members at the free ends thereof, prong means operatively connected to said carriage at one end thereof for dislodging debris from said grillwork upon movement of said cradle and said carriage in one direction along said grillwork, claw means attached to said cradle for facilitating the handling of said so dislodged debris upon movement of said cradle and said carriage in the opposite direction along said grillwork, means for raising said prong means upon the contacting thereof with said grillwork cross bar, said raising means being operatively connected to said prong means and having at least one arm operatively connected to said carriage at the frame member sidewall, said arm having a cam shaped edge at one end thereof and a curved edge on the other end thereof, whereby the retraction of said prong means from said grillwork is assured.

2. The apparatus of claim 1 wherein the means for raising said prong means includes a cross-piece member attached to the carriage and a shaft operatively connected to said crosspiece, said arm being movably mounted on said shaft, said prong means being operatively connected to said arm.

3. The apparatus of claim 1 wherein the means for controlling the carriage and the cradle in their simultaneous movement along said grillwork includes a cable operatively connected to said cradles and cables respectively connected to said lever member.

References Cited in the file of this patent

FOREIGN PATENTS

| | | |
|---|---|---|
| 174,598 | Great Britain | July 27, 1922 |
| 365,153 | Germany | Dec. 8, 1922 |